June 28, 1966  A. L. LULIE ETAL  3,257,882
SLITTER-SCORER APPARATUS HAVING AUTOMATIC ADJUSTING MEANS
Filed Sept. 11, 1964  7 Sheets-Sheet 1

INVENTORS.
ALBERT L. LULIE,
WARREN A. STEWART.
BY Oscar B Brumback
their ATTORNEY.

June 28, 1966  A. L. LULIE ETAL  3,257,882
SLITTER-SCORER APPARATUS HAVING AUTOMATIC ADJUSTING MEANS
Filed Sept. 11, 1964  7 Sheets-Sheet 3

Fig. 3.

INVENTORS.
ALBERT L. LULIE,
WARREN A. STEWART.
BY
Oscar B Brumback
their
ATTORNEY.

June 28, 1966  A. L. LULIE ETAL  3,257,882
SLITTER-SCORER APPARATUS HAVING AUTOMATIC ADJUSTING MEANS
Filed Sept. 11, 1964  7 Sheets-Sheet 4

Fig. 4.

INVENTORS.
ALBERT L. LULIE,
WARREN A. STEWART.
BY Oscar B Brumback
their
ATTORNEY

Fig. 5.

June 28, 1966 A. L. LULIE ETAL 3,257,882
SLITTER-SCORER APPARATUS HAVING AUTOMATIC ADJUSTING MEANS
Filed Sept. 11, 1964 7 Sheets-Sheet 6

Fig. 6.

INVENTORS.
ALBERT L. LULIE,
WARREN A. STEWART.
BY Oscar B Brumback
their
ATTORNEY.

Fig. 7

INVENTORS.
ALBERT L. LULIE,
WARREN A. STEWART.
BY
Oscar B Brumback
their
ATTORNEY.

United States Patent Office 3,257,882
Patented June 28, 1966

3,257,882
SLITTER-SCORER APPARATUS HAVING AUTOMATIC ADJUSTING MEANS
Albert L. Lulie, Baltimore, and Warren A. Stewart, Monkton, Md., assignors to Koppers Company, Inc., a corporation of Delaware
Filed Sept. 11, 1964, Ser. No. 395,846
14 Claims. (Cl. 83—9)

This invention relates to an assembly that includes a sheet engaging member and more particularly to a slitter-scorer assembly that has adjusting means to conjointly adjust all the slitter and scorer heads and to separately adjust pairs of slitter-scorer heads.

In the processing of sheet material, especially an endless web of corrugated paperboard, it is highly desirable to form the web as wide as possible and then slit the web into narrower strips. Score lines are also usually made in the web of corrugated paperboard at about the same time as the web is slit into preselected widths. The web forming apparatus is operated on a continuous basis and the operation is interrupted only at such times as the slitting and scoring apparatus is adjusted to change the widths and lengths of the web material for the production of carton blanks of preselected size. It is now possible to make rapid adjustments in the apparatus for cutting the continuous web into lengths of preselected dimension. With the presently known slitting and scoring apparatus, however, a substantial amount of time is required to adjust the apparatus for changing the widths of the strips cut from the web of corrugated paperboard and the score lines impressed on the respective strips. It is, therefore, highly desirable to provide apparatus for slitting and scoring the continuously moving web of corrugated paperboard that may be rapidly adjusted to change the widths of the strips cut or slit in a continuously moving web. Apparatus which reduces the adjustment time minimizes the amount of waste incurred in the corrugated paperboard manufacturing. Where a substantial period of time is required to make the adjustment, portions of the continuous web are subject to burning in adjacent equipment.

Slitting and scoring of a continuously moving web is now accomplished by a slitter-scorer device that includes three separate sets of shafts supported by spaced-apart side frames. The shafts have slitting and scoring heads mounted thereon. While the heads of one of the shafts are slitting or scoring the moving web, the operator manually adjusts the heads on the other two sets of inactive shafts to the desired transverse dimension or spacing for subsequent slitting of the web into different sized strips. This manual adjustment of the slitter-scorer heads is both time consuming and difficult to perform. Further, with the known slitter-scorer devices a plurality of sets of slitter-scorer heads are required and only one set of the plurality of sets is actively performing the slitting or scoring operation.

The set-up time for the positioning or adjusting of the heads on the two sets of inactive shafts that are not slitting or scoring the continuously moving web is excessive. With short order, that is, where only a short length of the continuous web is slit and scored into the preselected width, the operator does not have sufficient time to accurately adjust and set up the slitting and scoring heads on the inactive shafts for the next differently sized order. Interruption in the continuous process is usually required until the operator correctly adjusts the slitter-scorer heads on the inactive shafts.

Other problems are encountered in the presently known slitter-scorer devices. For example, the slitter-scorer heads are fabricated in halves and the halves are joined to each other with the drive shaft extending axially therethrough. The fabrication, positioning and replacement of the split-type slitter or scorer heads is expensive and time consuming. A unitary slitter-scorer head does not have the above discussed disadvantages. The presently known slitter-scorer devices are constructed with the drive shafts extending transversely across the apparatus with the slitter-scorer heads coaxially arranged thereon so that the use of the unitary slitter-scorer head is not feasible.

In the operation of the slitter-scorer apparatus it is highly desirable to provide a circumferential velocity for the slitter head that is slightly higher than the speed of the web of corrugated paperboard moving therebetween. The circumferential velocity of the scorer head, however, should be substantially equal to board speed. Where, as in the past, both the slitter and scorer heads are mounted on a common drive shaft, this optimum condition cannot be obtained.

Briefly, the invention includes apparatus for engaging a continuously moving sheet that has a pair of side frames with supporting means extending transversely therebetween. A plurality of carriages are supported on the supporting means above and below the continuously moving sheet and have web engaging members associated therewith. A plurality of common adjusting shafts extend through groups of the carriages and are interconnected within one of the side frames for conjoint rotation. An individual adjusting shaft is associated with each carriage and means within the carriage operatively connect the individual adjusting shaft to the common adjusting shaft. Pairs of the individual adjusting shafts associated with carriages arranged in substantially the same vertical plane are interconnected in one of the side frames for conjoint rotation. With this arrangement all of the carriages can be adjusted transversely relative to the continuously moving sheet by actuating all of the common adjusting shafts. Further, the individual pairs of carriages can be adjusted transversely relative to the continuously moving sheet by rotation of the respective individual adjusting shafts. A programming means is provided to preselect the relative positions of the carriages and the sheet engaging means to the continuously moving sheet. There is also provided an assembly wherein a plurality of sheet engaging devices are associated with a single carriage.

Although reference is made in the specification to the specific slitter, scorer and slotter discs, it should be understood that the sheet engaging devices can be used interchangeably and it is not intended that this invention be restricted to any specific type of sheet engaging disc.

Accordingly, the principal object of this invention is to provide a mechanical means for conjointly moving all of the carriages transversely relative to a continuously moving sheet.

Another object of this invention is to provide a mechanical means for adjusting pairs of the web engaging discs positioned above and below the continuously moving sheet.

Another object of this invention is to provide a means to program the position of the carriages relative to the continuously moving sheet passing therebetween.

Another object of this invention is to provide a carriage that has a plurality of web engaging discs associated therewith.

These and other objects and advantages of this invention will be more completely disclosed and described in the following specification, the accompanying drawings and the appended claims.

Figure 1:
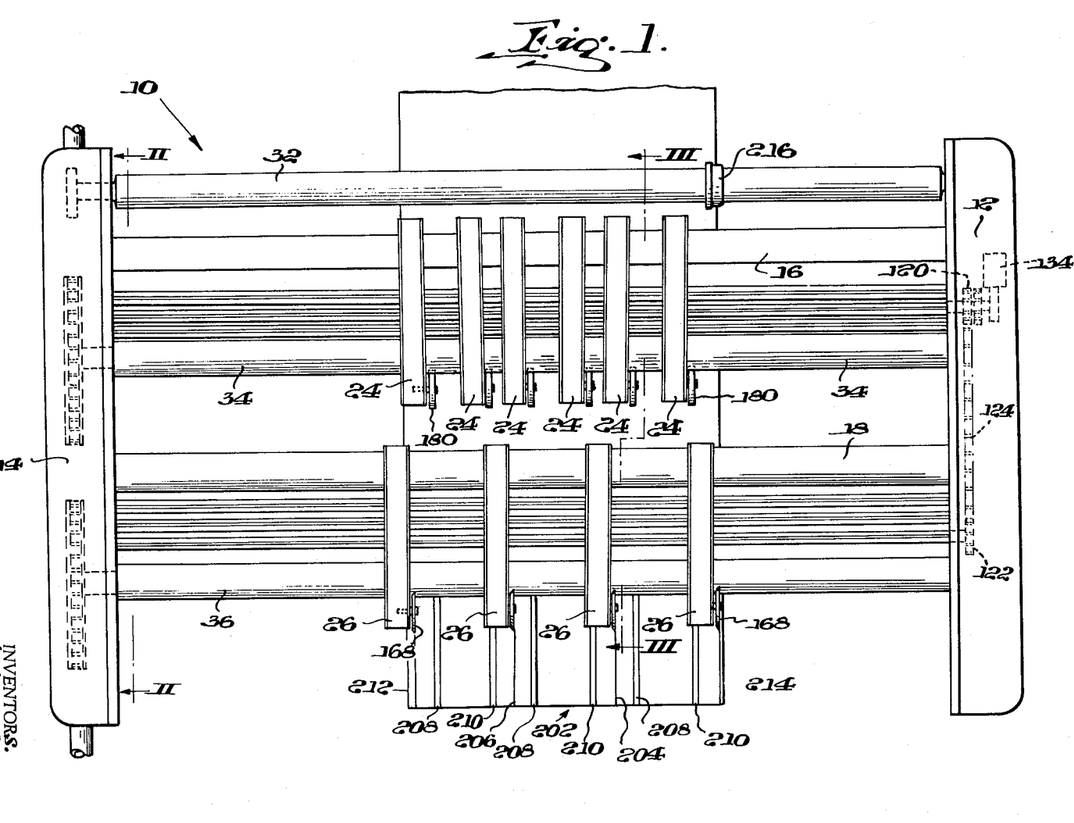
FIGURE 1 is a top plan view of the slitter-scorer assembly.
Figure 2:
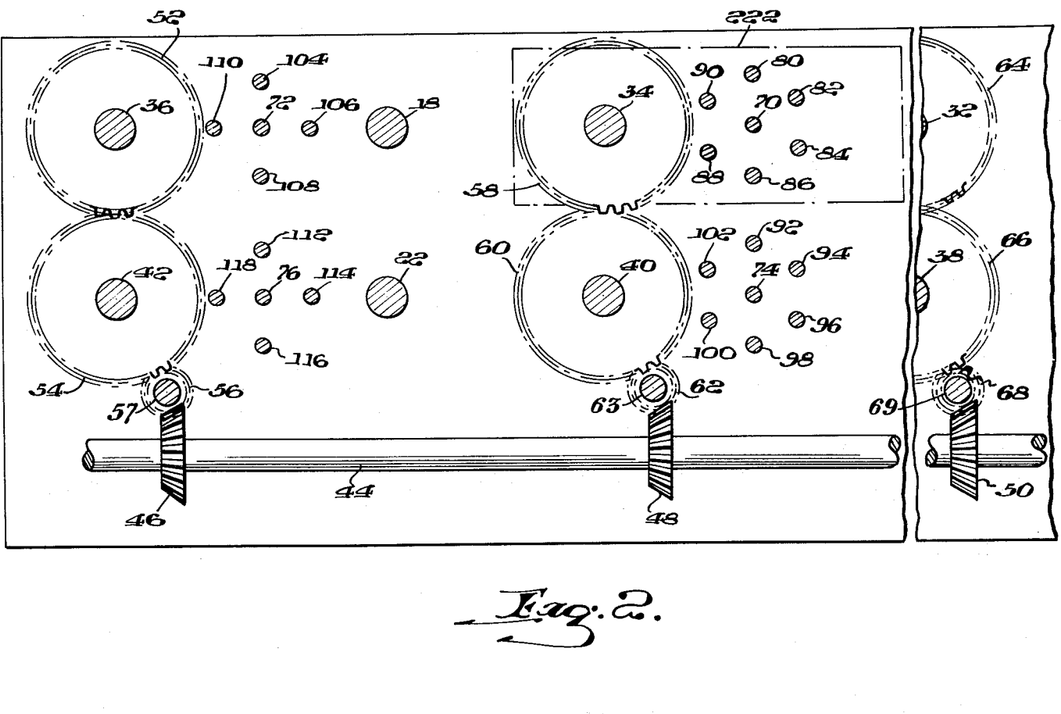
FIGURE 2 is a sectional view in side elevation taken along the line 2—2 of FIGURE 1.
Figure 3:
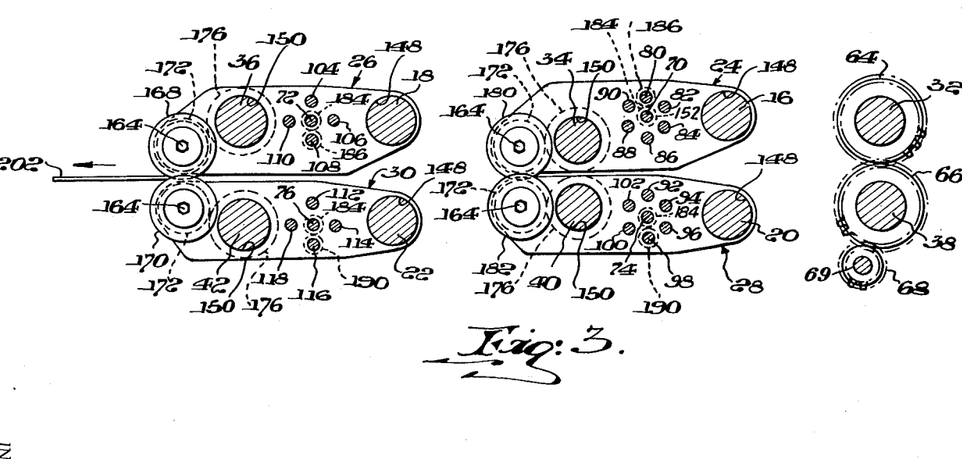
FIGURE 3 is a view in side elevation taken along the line 3—3 of FIGURE 1 and illustrating the pairs of slitter and scorer carriages positioned in the slitter-scorer assembly.

Referring to the drawings and more particularly to FIGURES 1, 2 and 3 there is illustrated a slitter-scorer assembly generally designated by the numeral 10 that has a pair of side frames 12 and 14. Extending transversely between the side frames 12 and 14 are four guide shafts 16, 18, 20 and 22. The guide shafts 16 and 18 support and guide the upper scorer and slitter carriages designated generally by the numerals 24 and 26. The guide shafts 20 and 22 support lower scorer and slitter carriages generally designated 28 and 30.

Extending transversely between the side frames 12 and 14 are drive shafts 32, 34, 36, 38, 40 and 42. The above drive shafts are arranged substantially parallel to and in spaced relation to the guide shafts 16–20. The drive shafts 32 and 38 are arranged to drive auxiliary slitter-scorer mechanisms that are coaxially arranged on and secured to the respective shafts 32 and 38. The drive shafts 34 and 36 are arranged to drive the upper scorer and slitter heads associated with the plurality of carriages 24 and 26. Similarly, the lower drive shafts 40 and 42 are arranged to drive the lower scorer and slitter heads associated with the carriages 28 and 30.

Extending longitudinally on the side frame 14 as illustrated in FIGURE 2 is a line shaft 44 that is connected to a common drive motor (not shown). The line shaft 44 has three bevel gears 46, 48 and 50 secured thereon for rotation therewith. The drive shafts 42 and 36 have gears 52 and 54 secured thereto for rotation therewith. The gears 52 and 54 are in meshing relation with each each other. The gear 54 meshes with an idler gear 56 whose shaft 57 turns with gear 59, FIGURE 4, that meshes with the bevel gear 46 secured to line shaft 44. Similarly, the drive shafts 34 and 40 have drive gears 58 and 60 secured thereto and rotatable therewith. The gears 58 and 60 are in meshing relation and mesh with an idler gear 62 whose shaft 63 turns with the gear 65, FIGURE 4, that meshes with the bevel gear 48 secured to line shaft 44. The auxiliary slitter-scorer drive shafts 32 and 38 have drive gears 65 and 66 connected thereto for rotation therewith. The gears 64 and 66 are in meshing relation with each other and mesh with an idler gear 68 whose shaft 69 turns with the gear 71, FIGURE 4, that meshes with the bevel gear 50 on line shaft 44. With this arrangement the line shaft 44 provides drive for the respective drive shafts through the gear trains previously described.

With each group of carriages, that is the upper scorer carriages 24, the upper slitter carriages 26 and the lower scorer carriages 28 and the lower slitter carriages 30, there is a common adjusting shaft. Shaft 70 extends transversely between the side frames 12 and 14 and is associated with the group of upper scorer carriages 24. A similar common adjusting shaft 72 is associated with upper scorer carriages 26. Common adjusting shafts 74 and 76 are associated with the lower scorer and slitter carriages 28 and 30 respectively.

Positioned parallel to and radially about the respective common adjusting shafts are a plurality of individual carriage adjusting shafts. For example, positioned radially about the common adjusting shaft 70 are individual carriage adjusting shafts 80, 82, 84, 86, 88 and 90. Each of the individual adjusting shafts is associated operatively with a different one of the upper scorer carriages 24. For example, as illustrated in FIGURE 3, the upper individual carriage adjusting shaft 80 is operatively associated with the upper scorer carriage 24.

The individual carriage adjusting shafts 80–90 are arranged in parallel relation to the common adjusting shaft 70 and are positioned radially thereabout. The lower scorer carriages 28 have a plurality of individual carriage adjusting shafts 92, 94, 96, 98, 100 and 102 positioned around the common adjusting shaft 74. It should be noted that the number of individual adjusting shafts is equal to the number of carriages arranged on the common guide shaft. For example, there are six upper and six lower scorer carriages 24 and 28 positioned on parallel guide shafts 16 and 20 and there are six individual carriage adjusting shafts associated with the six upper scorer carriages 24 and six individual adjusting shafts associated with six lower scorer carriages 28.

The upper slitter carriages 26 have four individual carriage adjusting shafts 104, 106, 108 and 110 arranged radially about the common adjusting shaft 72. Similarly, the lower slitter carriages 30 have associated therewith individual carriage adjusting shafts 112, 114, 116 and 118. As will later be explained the individual carriage adjusting shafts are operable to individually adjust pairs of the scorer or slitter carriages laterally between the assembly side frames 12 and 14.

As schematically illustrated in FIGURE 1, the common adjusting shafts 70 and 72 associated with the upper scorer carriages 24 and the upper slitter carriages 26 have sprockets 120 and 122 secured to their end portions that extend into the side frame 12. An endless chain 124 connects the sprockets 120 and 122 to each other so that both shafts 70 and 72 rotate in unison. A similar arrangement is provided for the shafts 74 and 76 associated with the lower scorer and slitter carriages 28 and 30 so that both shafts 74 and 76 rotate in unison.

Figure 4:
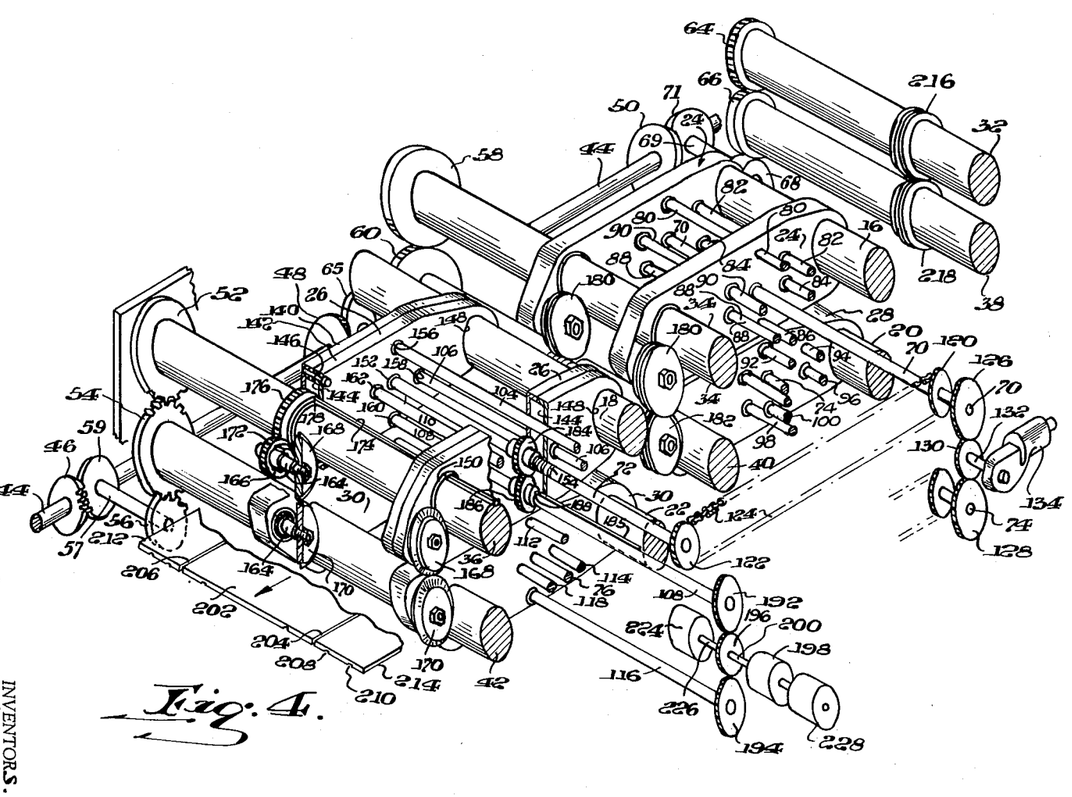
FIGURE 4 is a fragmentary perspective view of the slitter and scorer carriages with portions broken away to illustrate the drive mechanism for the slitter and scorer heads and portions broken away to illustrate the adjusting mechanism for the respective slitter and scorer carriages.

The gears 126 and 128, FIGURE 4, are nonrotatably secured to the common adjusting shafts 70 and 74. These gears 126 and 128 mesh with a gear 130 that is connected to shaft 132. The shaft 132 is driven by a motor 134. With this arrangement the motor 134 is arranged to activate all the common adjusting shafts 70, 72, 74 and 76 simultaneously to adjust all of the scorer and slitter carriages together in unison through a drive mechanism in each carriage.

FIGURE 4 also illustrates pairs of upper scorer carriages 24, lower scorer carriages 28, upper slitter carriages 26 and lower slitter carriages 30. The upper and lower slitter and score carriages 24, 26, 28 and 30 are similar in construction except that the scorer carriages have a larger number of individual adjusting shafts extending therethrough than the slitter carriages. The scorer carriages have provisions for six individual adjusting shafts to extend laterally therethrough, whereas the scorer carriages have provisions for only four individual adjusting shafts to pass therethrough. It should be understood, however, that a greater or lesser number of individual adjusting shafts may be utilized and the carriages constructed so that a greater or lesser number of scorer or slitter carriages may be positioned on the same common guide shaft. Other than the above exception, the slitter and scorer carriages are of substantially the same construction and similar numerals will be used for common elements on the respective slitter or scorer carriages.

Referring in detail to the construction of respective slitter and scorer carriages as illustrated in FIGURE 4 the carriages have a pair of flanged side walls 140 and 142 that form an enclosure or housing 144 therebetween.

The side walls 140 and 142 are maintained with the flanges in abutting relation with each other by bolts 146. Other suitable means, of course, could be utilized to maintain the side walls 140 and 142 in proper spaced relation with each other. The carriages have a guide shaft bore 148 therethrough adjacent the rear end portion and a drive shaft bore 150 therethrough adjacent the front end portion. The bores are so dimensioned that the respective guide shafts and drive shafts are freely rotatable therein and are movable axially thereon. The carriages also include a lateral bore 152 therethrough for the common adjusting shaft which is a screw threaded shaft having threads similar to threads 154 illustrated in FIGURE 4. Extending radially about the bore 152 are a plurality of bores for the individual adjusting shafts as, for example, bores 156, 158, 160 and 162 for the individual adjusting shafts 104, 106, 108 and 110 associated with the upper slitter carriages 26.

Extending through and rotatably supported in the carriages as, for example, upper slitter carriage 26 is a drive shaft 164 that is mounted in bearings 166 in the side walls of carriage 26. The shaft 164 extends outwardly beyond the side wall of the carriage 26 and has a slitter head 168 secured thereto. The lower slitter carriage 30 has a mating slitter head 170 secured to a similar shaft 166 extending outwardly from the carriage 30. Similar drive means are provided for both of the slitter heads 168 and 170 and includes a gear 172 nonrotatably secured to the shaft 164. The drive shafts, for example, drive shafts 36 and 42, have a longitudinal key 174 thereon.

A plurality of gears 176 are coaxially arranged on the drive shafts 36 and 42 and have a keyway 178 therein. The gears 176 are positioned within each carriage enclosure 144 and are movable axially on the respective drive shafts 36 and 42 and are nonrotatable relative thereto. Thus, lateral movement of the respective carriages 26 and 30 on the drive shafts 36 and 42 permit the gears 176 within the enclosures 144 of the carriages 26 to move axially on the respective drive shafts. The gear 176 on drive shaft 36 meshes with the gear 172 within the carriage enclosure 144 and the drive shaft 164. Thus, rotation of drive shafts 36 and 42 by means of the drive train previously described provides a drive for the slitter heads 168 and 170 at a preselected circumferential velocity.

The scorer carriages 24 and 28 have similar gearing arrangements within the individual carriages to transmit rotation from drive shafts 34 and 40 to the scoring heads 180 and 182 associated with the respective upper and lower scorer carriages 24 and 28.

Within the enclosure 144 of each of the carriages there is positioned a common adjusting gear 184 that is coaxially arranged on the respective common adjusting shaft. For example, within all of the upper slitter carriages 26 there is positioned a gear 184 on the common adjusting shaft 72. The gear 184 has a bore with an internally threaded portion that mates with externally threaded portion of the common adjustment shaft 72 so that upon rotation of the shaft 72 the gear 184 is axially displaced thereon when the gear does not rotate with the shaft 72. The gear 184 is positioned within the enclosure 144 of the respective carriages so that axial displacement of gear 184 relative to the common adjusting shaft will axially displace the carriages associated with the respective gears 184. As has been previously described, the common adjusting shafts 70, 72, 74 and 76 are interconnected to each other by the gear and chain arrangement illustrated in FIGURES 1 and 4. All of the shafts 70, 72, 74 and 76 rotate in unison to thereby move all of the upper and lower scorer and slitter carriages in a given direction relative to the side frames 12 and 14. Thus, by energizing the motor 134, all of the upper and lower slitter and scorer carriages can be moved from the right toward the left as viewed in FIGURE 1 a preselected distance. This arrangement provides a rapid edge adjustment for the slitter-scorer apparatus. The amount of adjustment of all the slitter and scorer carriages can be carefully controlled by controlling the motor 134.

Referring to FIGURES 3 and 4 the individual adjustment mechanism for the separate pairs of upper and lower scorer and slitter carriages will now be described. It again should be understood that the individual adjustment mechanisms are similar in construction and are included in each and everyone of the carriages. Pairs of upper and lower slitter carriages will be described with the individual adjustment mechanisms associated therewith. The upper slitter carriages 26 have four individual adjusting shafts 104, 106, 108 and 110 extending laterally therethrough. The bores in the carriages have a sufficient diametrical dimension to permit the carriages to slide axially on the individual adjusting shafts. Each of the adjusting shafts has a keyed portion 185 thereon.

An individual adjusting gear 186 has an externally toothed portion that meshes with the gear 184 arranged on the common adjusting shaft 72. The gear 186 has an internally keyed portion 188 which mates with the external key 185 on shaft 108. Thus, the gear 186 is movable axially on shaft 108 and is nonrotatable relative thereto. The rotation of gear 186, while the common adjusting shaft 72 is maintained stationary, rotates the gear 184 relative to the common adjusting shaft 72.

Because of the threaded portion 154 on shaft 72 the rotation of gear 184 by gear 186 moves the carriage 26 axially on the common shaft 72 and hence on the guide shaft 18 to adjust the relative position of the carriage 26 that has the gear 184 actuated by gear 186 from shaft 108. The lower mating slitter carriage 30 has a similar gear 190 arranged axially on shaft 116. The gear 190 is illustrated in FIGURE 3. Both the shafts 108 and 116 have gears 192 and 194 nonrotatably connected to their end portions within the side frames 12. The gears 192 and 194 mesh with a common gear 196.

A servomechanism 198 is connected to gear 196 through shaft 200. Thus, when servomechanism 198 is energized to rotate the shaft 200 in a given direction, the gears 192 and 194 rotate the respective shafts 108 and 116 to rotate the gears 186 within the upper and lower slitter carriages 26 and 30 to thus adjust the mating carriages of 26 and 30 relative to the side frame 12. On shaft 108 there is positioned only one gear 186 that meshes with gear 184 within a single carriage 26. Similarly on shaft 116 there is positioned within one carriage 30 only one gear 190 that meshes with a gear 184 therein. Thus, rotation of gears 192 and 194 adjusts only one pair of upper and lower slitter carriages 26 and 30. The other individual adjusting shafts 104, 106 and 110 have associated therewith a single gear similar to the gear 186 that is arranged within one of the other slitter carriages 26. Pairs of shafts, for example, upper individual adjusting shaft 104 and lower individual adjusting shaft 112, are connected through gearing similar to gearing 192, 194 and 196 to a separate servomechanism 198. Thus, there is provided for each pair of upper and lower slitter carriages and upper and lower scorer carriages a separate servomechanism 198 which upon energization can independently adjust the separate overlying pairs of carriages. It should be noted since the adjusting mechanisms for the overlying pairs of upper and lower carriages are connected to a common drive mechanism that the separate pairs of carriages are adjusted as a unit on the respective guide shafts. With the above described arrangement a separate individual adjusting mechanism for each pair of carriages is provided that can rapidly move the carriages on the guide shafts 18.

In FIGURE 4 an endless web of corrugated paperboard is generally designated by the numeral 202 with the slits 204 and 206 formed therein to provide three strips from a single web 202. Each of the strips has a pair of scores 208 and 210 formed therein. To so process a web 202 four pairs of slitter carriages are required to trim the two edge portions 212 and 214 and to form the slits 204 and 206. To form the scores 208 and 210, six scorer heads are required, as is illustrated in FIGURE 1.

The slitter-scorer assembly 10 also includes apparatus for slitting and scoring the web 202 at dimensions less than what is commonly called the minimum centers, that is, the physical dimension between the slitter or scorer heads arranged on the slitter or scorer carriages. The minimum centers is defined as the minimum lateral distance that is possible due to the physical lateral dimension of the carriages that support the scorer and slitter heads. Infrequently, it is desirable to slit or score the endless web 202 at dimensions that are less than the dimension between the minimum centers. A pair of drive shafts 32 and 38 are provided, as is illustrated in FIGURES 1, 3 and 4, on which there are axially positioned slitter or scorer heads 216 and 218. The heads 216 and 218 are axially adjustable along the drive shafts 32 and 38 so that slits and score lines may be produced in addition to the ones produced by the slitter or scorer heads mounted on the respective carriages. Since the requirement for minimum centers less than that possible to be obtained with the slitters or scorers mounted on the carriages is seldom encountered, the auxiliary heads 216 and 218 are manually adjusted. It should be understood, however, where frequent use of the heads 216 and 218 is required, the auxiliary heads 216 and 218, by the use of carriages similar to the adjustable carriages previously described, could also be fabricated to be automatically adjustable relative to the web 202.

The slitter-scorer assembly 10 includes a means to vertically adjust the scorer heads associated with the upper scorer carriages 24. The adjustment means includes a supporting plate 222 in both frames 10 and 12 that carry the shafts associated with the upper scorer carriages 24. By moving the plates 222 in a vertical manner by a suitable vertical adjustment means, such as a screw thread device or the like, it is possible to orient the top scorer heads 180 relative to the web 202. This vertical adjustment of the scorer heads 180 provides a means of utilizing the slitter-scorer assembly with corrugated paperboard having different thicknesses. Any suitable means may be provided to move the adjusting plates 222 vertically relative to the side frames 12 and 14.

Figure 5:
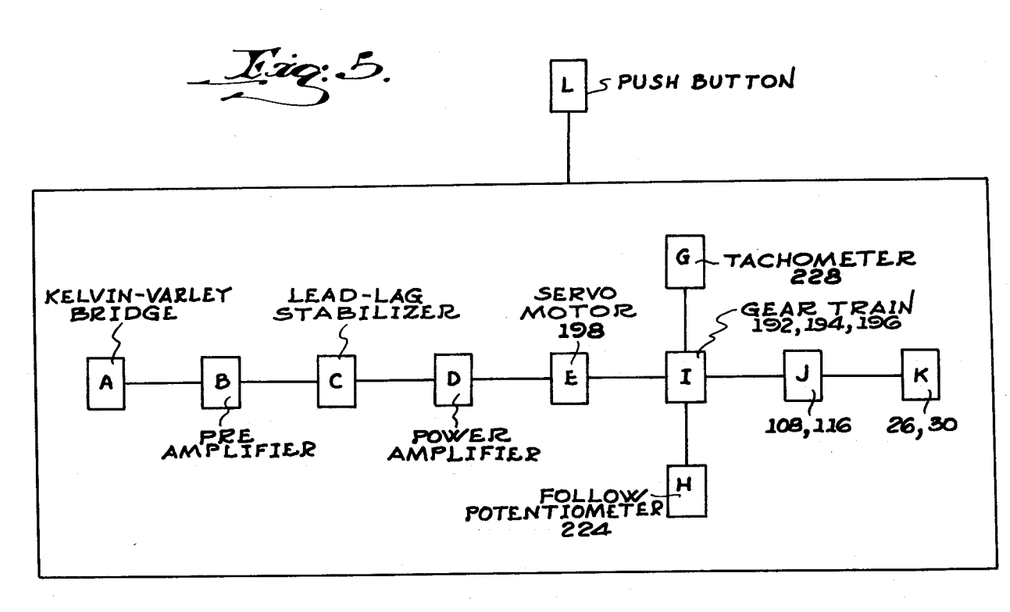
FIGURE 5 is a diagrammatic view of the control means for positioning the slitter and scorer carriages.

There is illustrated in FIGURE 5 a diagrammatic representation of a suitable control system to automatically position the respective carriages. The diagrammatic block diagram of FIGURE 5 refers to an electronic analog servomechanism that automatically positions the carriages. It should be understood the control system illustrated in FIGURE 5 is for illustrative purposes only and it is not intended that the invention herein described be limited thereto.

The system described in FIGURE 5 permits the operator to preselect the positions of the respective carriages required for the next order while the machine is slitting and scoring the current order, by merely dialing the required setting. When the slitter-scorer assembly 10 is stopped to change orders, the operator, merely by means of buttons or other types of actuators, energizes the control system to move the carriages to their preselected desired positions.

The system basically operates on the principal of matching signals. A signal is generated by the selector switch and another signal is generated by the follow potentiometer 24 which is connected to the carriages through the shaft 226 and gearing 196, 192 and 194. The signal generated by the potentiometer will vary depending on the position of the pairs of carriages. The system is designed so that the servomotor 198 will cause the carriage to move until the signal generated by the follow potentiometer 224 matches the signal of the selector switch. When the signals match, the servomotor is de-energized and the carriage is in the position indicated by the selector switch.

Referring to FIGURE 5 the letter A designates a Kelvin Varley bridge from which a signal can be selected corresponding to a desired carriage position by means of typical rotary selector switches. The signal generated is, in the embodiment illustrated, a 60-cycle voltage. This signal voltage is used through amplification to drive the servomotor 198. At the same time the follow potentiometer 224 will generate a signal voltage corresponding to the carriage position. As the servomotor 198 drives the carriage, the follow potentiometer voltage will change. The servomotor 198 will continue to run and move the respective pairs of carriages until the voltage signal from the follow potentiometer 224 matches that of the Kelvin Varley bridge. When the signals match there will be zero voltage to drive the servomotor. In this manner the carriage is positioned according to the setting made on the rotary selector switch. Similarly systems are required to position each of the pairs of carriages.

In FIGURE 5 the letter B designates a preamplifier which amplifies the signal voltages and mixes the signals so that when the signals from the Kelvin Varley bridge and the follow potentiometer match, the servomotor 198 will stop and the carriage will be in the position indicated by the rotary switch. The block indicated by the letter C designates a lead-lag stabilizer that prevents the servomotor 198 from hunting as it approaches the desired setting. A tachometer is indicated by the letter G in FIGURE 5 and by the numeral 228 in FIGURE 4. The tachometer G supplies a velocity dependent signal to the preamplifier B that mixes the signal with the signals provided by the potentiometer 224 and the Kelvin Varley bridge to prevent the servomechanism 198 from running past the point of zero signal voltage. This minimizes the "hunting" of the servomotor 198. The block designated by the letter D is a power amplifier that functions to further amplify the properly mixed signals so that the signals have sufficient power to drive the servomotor 198 at a low differential voltage between the signal generated by the Kelvin Varley bridge and the follow potentiometer 224. The block E indicates the servomotor 198 that drives the respective pairs of carriages. K generally indicates a pair of associated carriages. I indicates the gear train 192, 194 and 196. H is the follow potentiometer and J indicates the shafting connecting the gear train 192, 194 and 196 to the respective pair of carriages 26 and 30 includes shafts 108 and 116. L generally indicates the push button used to energize the system and is so arranged that the desired settings can be made on the Kelvin Varley bridge while the slitter-scorer assembly 10 is in operation. As soon as the order is completed, the button L is depressed and the system is energized to move the carriages to the preselected position.

Figure 6:
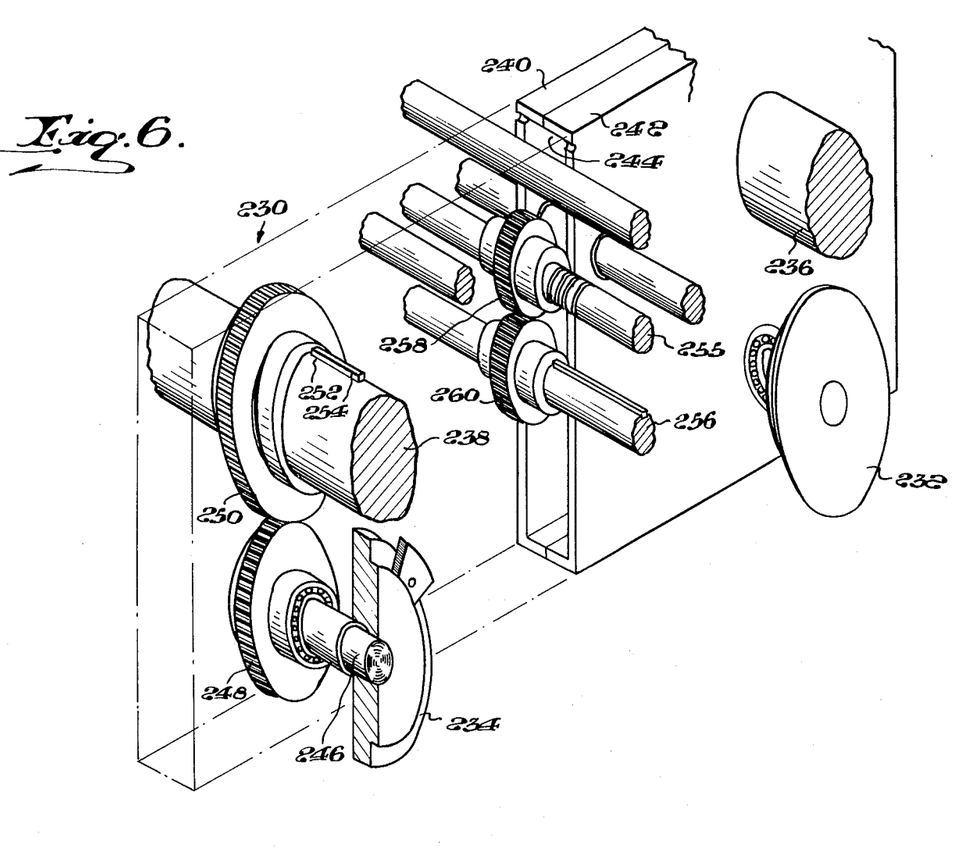
FIGURE 6 is a perspective view of a scoring and slotting head arranged on the same carriage.
Figure 7:
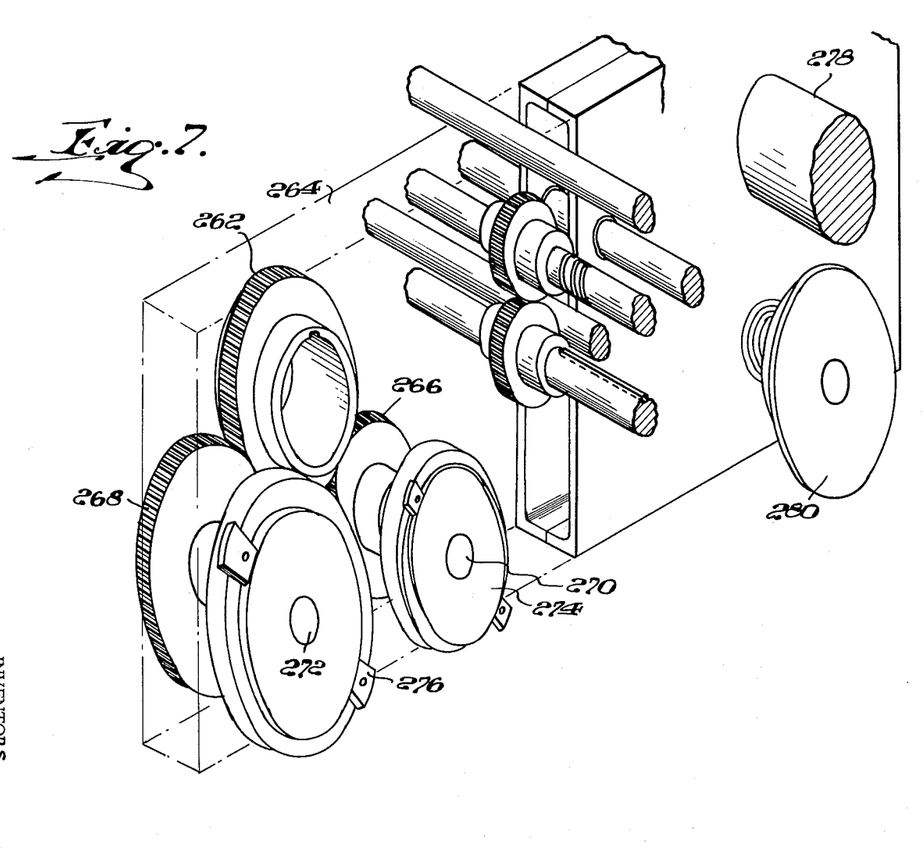
FIGURE 7 is a fragmentary perspective view of a pair of slotting heads and a scoring head arranged on a common carriage.

The versatility of the assembly previously described is illustrated by FIGURES 6 and 7. A carriage generally designated by the numeral 230 in FIGURE 6 includes scoring and slotting heads 232 and 234. A carriage similar to carriage 230 would provide a device that may be used with a printer-slotter. In a printer-slotter the slot and score lines trail each other in a straight line. There is provided a pair of drive shafts 236 and 238 that are connected to suitable drive gearing within the side frame 14. Only the drive means between the drive shaft 238 and the slotting head 234 is illustrated. It should be understood, however, that a similar drive train is provided between drive shaft 236 and scoring head 232. The carriage 230 includes a pair of inwardly flanged side frames 240 and 242 which provide an enclosure 244 therebetween. Rotatably supported by the side frames 240 and 242 is a stub shaft 246 that has secured to the end portion extending beyond the side frame 242 a slotting head 234. Within the housing 244 a drive gear 248 is nonrotatably secured to shaft 246 and meshes with a gear 250 coaxially positioned on drive shaft 238. The gear 250 has an internal axial slot 252 that mates with an external spline 254 on drive shaft 238. The gear 250 is thus movable axially on shaft 238 and is nonrotatable relative thereto because of the spline 254. Thus, rotation of shaft 238 provides a drive for the slotting head 234 through the meshing gearing 250 and 248 and shaft 246. The scoring head 232 is driven by drive shaft 236 in a similar manner. The carriage 230 has a common adjusting shaft 255 extending therethrough with an associated individual adjusting shaft 256 and the associated gearing 258 and 260, as has been described in FIGURE 4, to simultaneously adjust all of the carriages relative to the side frames 12 and 14 and to independently adjust the carriage 230 by actuation of individual adjusting shaft 256.

In FIGURE 7 there is illustrated a further modification of the carriage to include an auxiliary slotter head to provide extended slotting in the printer-slotter operation. A drive gear 262 is supported within a carriage 264 and meshes with a pair of gears 266 and 268. Shafts 270 and 272 are rotatably supported in the carriage 264 and have the gears 266 and 268 nonrotatably secured thereto. A regular slotting head 274 is nonrotatably secured to the projecting end of shaft 270. An auxiliary extended slotting head 276 having a diameter larger than the diameter of a regular slotting head 274 is secured to the projecting end of shaft 272. The gears 266 and 268 mesh with the gear 262 that is coaxially positioned on a drive shaft. Thus, rotation of the drive shaft extending through the gear 262 drives both gears 266 and 268 to rotate both of the slotting heads 274 and 276 in the same direction. There is also provided a drive shaft 278 for a scoring head 280. A similar adjusting mechanism for the carriage 264 is provided as that illustrated in FIGURES 4 and 6.

It will be apparent from the foregoing description that it is now possible with the slitter-scorer assembly herein described to rapidly adjust the pairs of slitter and scorer carriages relative to the web of corrugated paperboard passing therebetween. The slitter-scorer carriages are mechanically interconnected so that the pairs are adjusted in unison and maintain the predetermined overlying relation for proper spacing of the slitter and scorer heads. There is also provided an automatic means to adjust all of the slitter and scorer carriages relative to the web of corrugated paperboard to provide for accurate edge control. The mechanical interlocking of the pairs of slitter-scorer carriages provide maximum accuracy in adjusting the pairs of slitter or scorer carriages. The actuator mechanism for adjusting the individual pairs of slitter and scorer carriages now makes it possible to program the next order while the slitter-scorer assembly is slitting and scoring the present order. As soon as the present order is completed, the machine is stopped and the preprogramed dimensions of the next order that is preset in the control mechanism is fed to the actuators to rapidly reposition the slitter and scorer carriages for the next subsequent order. The apparatus herein described eliminates the time consuming operations previously required to individually adjust the relative position of the scorer and slitter heads on the shafts of the slitter-scorer assemblies.

According to the provisions of the patent statutes, the principal, preferred construction, and mode of operation of the invention have been explained, and what is now considered to represent its best embodiment has been illustrated and described. However, it should be understood that, within the scope of the appended claims, the invention may be practiced otherwise than as specifically illustrated and described.

We claim:

1. In a machine of the class described the combination comprising
    a side frame arranged to be positioned adjacent an edge of a continuously moving sheet,
    support means extending laterally from said side frame and arranged to support a plurality of carriages thereon adjacent said continuously moving sheet,
    a common adjusting shaft secured in said side frame and extending laterally therefrom, said common adjusting shaft associated with each of said carriages,
    a plurality of individual adjusting shafts secured in said side frame in parallel spaced relation to said common adjusting shaft, each of said carriages having one of said individual adjusting shafts associated therewith,
    said carriages each having means connecting said individual adjusting shaft associated therewith with said common adjusting shaft,
    means to rotate said common adjusting shaft and conjointly move all of said carriages associated therewith transversely relative to said continuously moving web, and
    other means to rotate said individual adjusting shafts and move said carriage associated therewith transversely relative to said continuously moving sheet.

2. In a machine of the class described the combination comprising
    a side frame arranged to be positioned adjacent an edge of a continuously moving sheet,
    supporting means extending a plurality of carriages frame and arranged to support a plurality of carriages thereon above and below said continuously moving sheet,
    an upper common adjusting shaft rotatably secured in said side frame and extending laterally therefrom, said supper common adjusting shaft associated with each of said carriages positioned above said continuously moving sheet,
    a plurality of upper individual adjusting shafts rotatably secured in said side frame in parallel spaced relation to said upper common adjusting shaft, each of said carriages positioned above said continuously moving sheet having one of said upper individual adjusting shafts associated therewith,
    a lower common adjusting shaft rotatably secured in said side frame and extending laterally therefrom, said lower common adjusting shaft associated with each of said carriages positioned below said continuously moving sheet,
    a plurality of lower individual adjusting shafts rotatably secured in said side frame in parallel spaced relation to said lower common adjusting shaft, each of said carriages positioned beneath said continuously moving sheet having one of said individual adjusting shafts associated therewith,
    said carriages positioned above said continuously moving sheet each having means connecting said upper individual adjusting shaft associated therewith with said upper common adjusting shaft,
    said carriages positioned below said continuously moving sheet each having means connecting said lower individual adjusting shaft associated therewith with said lower common adjusting shaft,
    means to rotate both said upper and lower common adjusting shafts and conjointly move all of said carriages transversely relative to said continuously moving sheet, and
    other means to rotate said individual adjusting shafts and move said carriage associated therewith transversely relative to said continuously moving sheet.

3. A machine of the class described as set forth in claim 1 in which
    said means within said carriages connecting said individual adjusting shaft associated therewith with said common adjusting shaft includes
    a first gear having an internally threaded bore coaxially positioned on said common adjusting shaft,
    said common adjusting shaft having an externally threaded portion so that upon rotation of said common adjusting shaft said first gear moves axially on said common adjusting shaft, a second gear coaxially positioned on said respective adjusting shaft in nonrotatable relation thereto and axially movable thereon, said second gear meshing with said first gear so that upon rotation of said individual adjusting shaft said second gear rotates said first gear relative to said common adjusting shaft and moves said carriage on said common adjusting shaft.

4. A machine of the class described as set forth in claim 2 which includes means connecting said individual adjusting shafts associated with carriages arranged in the same vertical plane, and means to rotate said pairs of individual adjusting shafts and move pairs of said carriages transversely relative to said continuously moving sheet.

5. A machine of the class described as set forth in claim 1 which includes a sheet engaging means secured to each of said carriages, and drive means for said sheet engaging means supported by said frame member and operatively connected through said carriages to said sheet engaging member.

6. A machine of the class described as set forth in claim 1 in which each of said carriages includes a plurality of aligned lateral passageways therethrough, said common adjusting shaft and said individual adjusting shafts extending through said aligned passageways in all of said carriages, and said carriages each having a housing enclosing means connecting said respective individual adjusting shafts to said common adjusting shaft.

7. A machine for slitting and scoring a continuously moving sheet comprising a pair of side frames arranged to be positioned on opposite sides of a continuously moving sheet, upper and lower scorer carriage support means secured to and extending transversely between said side frames above and below said continuously moving sheet, upper and lower slitter carriage support means secured to and extending transversely between said side frames above and below said continuously moving sheet in spaced relation to said scorer carriage support means, a plurality of upper scorer carriages supported by said upper scorer carriage support means above said continuously moving sheet, said upper scorer carriages being movable laterally on said upper carriage support means, a plurality of lower scorer carriages supported by said lower scorer carriage support means, said lower scorer carriages being movable laterally on said lower scorer carriage support means, said scorer carriages having scorer discs rotatably secured thereto and operable to engage said continuously moving sheet, a plurality of upper slitter carriages supported on said upper slitter carriage support means, said upper slitter carriages being movable laterally on said upper slitter carriage support means, a plurality of lower slitter carriages supported on said lower slitter carriage support means, said lower slitter carriages being movable laterally on said lower slitter carriage support means, said upper and lower slitter carriages having slitter discs rotatably secured thereto and operable to engage said continuously moving sheet, an upper scorer common adjusting shaft rotatably supported by said side frames and connected to all of said upper scorer carriages, a plurality of upper individual scorer carriage adjusting shafts secured in said side frame in parallel spaced relation to said upper scorer carriage common adjusting shaft, each of said upper scorer carriages having one of said individual upper scorer carriage adjusting shafts associated therewith, a lower scorer carriage common adjusting shaft rotatably supported by said side frames and connected to all of said lower scorer carriages, a plurality of individual lower scorer carriage adjusting shafts rotatably supported in said side frames in parallel spaced relation to said lower scorer carriage common adjusting shaft, each of said lower scorer carriages having one of said individual lower scorer carriage adjusting shafts associated therewith, an upper slitter common adjusting shaft rotatably supported by said side frames and connected to all of said upper slitter carriages, a plurality of individual upper slitter carriage adjusting shafts rotatably supported in said side frames in parallel spaced relation to said upper slitter common adjusting shaft, each of said upper slitter carriages having one of said individual upper slitter carriage adjusting shafts associated therewith, a lower slitter common adjusting shaft rotatably supported by said side frames and connected to all of said lower slitter carriages, a plurality of individual lower slitter carriage adjusting shafts rotatably supported in said side frames in parallel spaced relation to said lower slitter common adjusting shaft, each of said lower slitter carriages having one of said individual lower slitter carriage adjusting shafts associated therewith, means within said carriages connecting said individual adjusting shaft associated therewith with said respective common adjusting shaft, said common adjusting shafts arranged upon rotation to conjointly move all of said carriages transversely relative to said continuously moving sheet, said individual adjusting shafts arranged upon rotation to move said individual carriage associated therewith transversely relative to said continuously moving sheet, means conecting all of said common adjusting shafts, and drive means connected to said last named means and operable to rotate all of said common adjusting shafts at substantially the same angular velocity to thereby conjointly move all of said carriages transversely relative to said continuously moving sheet.

8. A machine for slitting and scoring a continuously moving sheet as set forth in claim 7 which includes a plurality of drive shafts rotatably supported in said side frames and operatively connected to said respective slitter and scorer discs, and means in said side frame to rotate all of said drive shafts and thereby rotate all of said slitter and scorer discs at preselected angular velocities.

9. A machine for slitting and scoring a continuously moving sheet as set forth in claim 7 in which said means connecting all of said common adjusting shafts includes, gears nonrotatably secured to the end portions of all of said common adjusting shafts, pairs of endless chains connecting said pair of upper common adjusting shafts and said pair of lower common adjusting shafts, other gear means nonrotatably connected to said upper scorer common adjusting shaft and said lower scorer common adjusting shaft, and said last named gear means meshing with gear means connected to said drive means for rotating all of said common adjusting shafts.

10. A carriage for a machine of the class described comprising a pair of side walls forming a housing therebetween, a common adjusting shaft bore extending through both of said side walls, a first gear having an externally toothed portion and an internally threaded axial bore positioned in said housing with said threaded axial bore aligned with said common adjusting shaft bore in said side walls, an externally threaded common adjusting shaft extending axially through said common adjusting shaft bore in said side walls and said first gear internally threaded axial bore, an individual adjusting shaft bore extending through both of said side walls in lateral spaced relation to said common adjusting shaft bore, a second gear having an externally toothed portion and an internal bore positioned in said housing with said internal bore aligned with said individual adjusting shaft bore in said side walls, said second gear meshing with said first gear, an individual adjusting shaft extending axially through said individual adjusting shaft bore in said side walls and said second gear internal bore, said second gear coaxially positioned on said individual adjusting shaft in nonrotatable relation thereto and axially movable relative thereto, and said individual adjusting shaft arranged upon rotation to rotate said first gear through said second gear to thereby move said carriage on said common adjusting shaft.

11. A carriage for a machine of the class described as set forth in claim 10 in which said pair of side walls have a drive shaft bore extending therethrough in lateral spaced relation to said common adjusting shaft bore, a drive gear having an externally toothed portion and an axial bore therethrough positioned in said housing, a drive shaft extending through said drive shaft bore in said side walls and said drive gear axial bore, and said drive gear nonrotatably secured to said drive shaft and axially movable relative thereto so that said drive gear rotates upon rotation of said drive shaft in all respective positions of said drive gear on said drive shaft.

12. A carriage for a machine of the class described comprising a pair of side walls forming a housing therebetween, a drive shaft bore extending through said housing side walls, a drive gear having an externally toothed portion and an axial bore positioned in said housing with said axial bore aligned with said drive shaft bore in said side walls, a drive shaft extending through said drive shaft bore and said axial bore in said drive gear, said drive gear nonrotatably positioned on said drive shaft and axially movable relative thereto, a plurality of spindles rotatably supported in said side walls in spaced relation to said drive shaft, each of said spindles having an end portion extending beyond one of said end walls, each of said spindle end portions having a sheet engaging disc nonrotatably secured thereto for rotation therewith, and each of said spindles having a gear coaxially positioned thereon for rotation therewith, said gears meshing with said drive gear so that said sheet engaging discs are rotated with said spindles upon rotation of said drive shaft.

13. A carriage for a machine of the class described comprising a pair of side walls forming a housing therebetween, a common adjusting shaft bore extending through both of said side walls, a first gear having an externally toothed portion and an internally threaded axial bore positioned in said housing with said threaded axial bore aligned with said common adjusting shaft bore in said side walls, an externally threaded common adjusting shaft extending axially through said common adjusting shaft bore in said side walls and said first gear internally threaded axial bore, an individual adjusting shaft bore extending through both of said side walls in lateral spaced relation to said common adjusting shaft bore, a second gear having an externally toothed portion and an internal bore positioned in said housing with said internal bore aligned with said individual adjusting shaft bore in said side walls, said second gear meshing with said first gear, an individual adjusting shaft extending axially through said individual adjusting shaft bore in said side walls and said second gear internal bore, said second gear coaxially positioned on said individual adjusting shaft in nonrotatable relation thereto and movable axially relative thereto, a drive shaft bore extending through said housing side walls in lateral spaced relation to said common adjusting shaft bore and said individual adjusting shaft bore, a drive gear having an externally toothed portion and an axial bore positioned in said housing with said axial bore aligned with said drive shaft bore in said side walls, a drive shaft extending through said drive shaft bore and said axial bore in said drive gear, said drive gear nonrotatably positioned on said drive shaft and axially movable relative thereto, a spindle rotatably supported in said side walls in lateral spaced relation to said drive shaft bore, said spindle having an end portion extending outwardly therefrom, a sheet engaging disc nonrotatably secured to said spindle end portion for rotation therewith, said spindle having a gear coaxially positioned thereon within said housing for rotation therewith, said last named gear meshing with said drive gear so that said sheet engaging disc is rotated with said spindle upon rotation of said drive shaft, and said individual adjusting shaft arranged upon rotation to rotate said first gear through said second gear to thereby move said carriage on said common adjusting shaft.

14. A carriage for a machine of the class described comprising a pair of side walls forming a housing therebetween, a plurality of spindles rotatably supported in said side walls in spaced relation to each other, each of said spindles having an end portion extending beyond one of said end walls, each of said spindle end portions having a sheet engaging disc nonrotatably secured thereto for rotation therewith, a plurality of drive shafts extending through drive shaft bores in said side walls, and means connecting certain of said drive shafts to certain of said spindles so that said sheet engaging discs are rotated with said spindles upon rotation of said drive shaft.

References Cited by the Examiner

UNITED STATES PATENTS

| | | | |
|---|---|---|---|
| 204,415 | 6/1878 | Asher et al. | 83—495 |
| 2,701,613 | 2/1955 | Bishop | 93—58.2 X |
| 2,796,931 | 6/1957 | Kuenn et al. | 83—9 |
| 3,093,037 | 6/1963 | Ward | 93—58.2 |

ANDREW R. JUHASZ, *Primary Examiner.*